United States Patent [19]
Willingshofer et al.

[11] 4,070,123
[45] Jan. 24, 1978

[54] BALL JOINT

[75] Inventors: Walter Willingshofer, Hofingen; Gerhard Hopsch, Obersulm; Karlheinz Böse, Stuttgart, all of Germany

[73] Assignee: Daimler-Benz Aktiengesellschaft, Germany

[21] Appl. No.: 540,341

[22] Filed: Jan. 13, 1975

[30] Foreign Application Priority Data
Jan. 19, 1974 Germany .............................. 2402506

[51] Int. Cl.² ............................................. F16C 11/06
[52] U.S. Cl. .................................... 403/132; 403/134; 280/674
[58] Field of Search ............... 403/132, 133, 134, 135, 403/138, 140; 280/96.2 R, 96.2 A, 674

[56] References Cited
U.S. PATENT DOCUMENTS

| 3,037,787 | 6/1962 | Gottschald | 403/133 X |
| 3,282,602 | 11/1966 | Willingshofer et al. | 403/138 X |
| 3,549,167 | 12/1970 | Haverbeck | 403/140 X |
| 3,650,552 | 3/1972 | Schmid | 403/140 |

FOREIGN PATENT DOCUMENTS 1,011,227  11/1965  United Kingdom ........... 280/96.2 A Primary Examiner—Andrew V. Kundrat
Attorney, Agent, or Firm—Craig & Antonelli

[57] ABSTRACT

A ball joint which includes a ball pin that is connected with a coaxial strut, a bearing part of synthetic material, a ball housing surrounding the bearing part, and a bellows seal, particularly as used with front axles of motor vehicles equipped with a braking support. The ball housing is equipped with abutment surfaces which abut at rubber spring elements having a progressive spring characteristic while the rubber spring elements project from an outer housing which has a spacing on all sides from the ball housing.

25 Claims, 3 Drawing Figures

BALL JOINT

The present invention relates to a ball joint with a ball pin which is connected with a coaxial adjoining strut, with a bearing of synthetic plastic material, with a ball housing surrounding the bearing and with a bellows seal, especially for a front axle of a motor vehicle provided with a braking support.

A ball joint which is constructed in this manner is already described in German Auslegeschrift No. 1,916,579, whereby the bearing member supports the ball head without play but yieldingly. For purposes of attaining this freedom of play, the bearing member consisting of two halves is installed with prestress. Though one obtains thereby a good shock-absorption or shock-damping, the ease of movement of the joint is far-reachingly lost thereby. Simultaneously, the danger increases that during pivoting operations of the ball, noises may occur which are transmitted to the body in an unpleasant manner.

It is therefore the purpose of the present invention to provide a ball joint which combines the advantages of a particular ease of motion under complete noise freedom with those of a good shock-absorption.

Accordingly, a ball joint of the aforementioned type is proposed whereby according to the present invention the ball housing is provided with abutment surfaces which abut possibly by interconnection of at least one spring washer or spring retainer at rubber spring elements equipped with progressive characteristics which project from an outer housing having a spacing from the ball housing on all sides thereof.

An ease of assembly and good damping action is achieved if the outer housing is constructed two-partite and if during the assembly of the two housing parts, a predetermined prestress is applied onto the rubber spring elements.

It is of advantage if during tension and compression loads of the strut, respectively different, mutually independent rubber spring elements are used for the force absorption.

In one embodiment of the present invention, a series-connection of at least two different types of rubber spring elements is provided whereby at least one rubber spring element is able to absorb both tension and compression loads.

It may be useful if the rubber spring elements are protected against external influences by a cap supported at the ball pin and at the outer housing.

Accordingly, it is an object of the present invention to provide a ball joint of the aforementioned type which avoids by simple means the shortcomings and drawbacks encountered in the prior art.

Another object of the present invention resides in a ball joint which preserves ease of motion while simultaneously eliminating the occurrence of noises in the ball joint during pivotal movements.

A further object of the present invention resides in a ball joint which possesses a good damping action yet can be readily installed.

A still further object of the present invention resides in a ball joint of the type described above in which different spring elements are used for the force absorption of tension and compression loads.

Still another object of the present invention resides in a ball joint in which the maximum stress per unit area of the rubber spring elements can be kept within tolerable limits.

These and other objects, features and advantages of the present invention will become more apparent from the following description when taken in connection with the accompanying drawing which shows, for purposes of illustration only, two embodiments in accordance with the present invention, and wherein.

Figure 1:
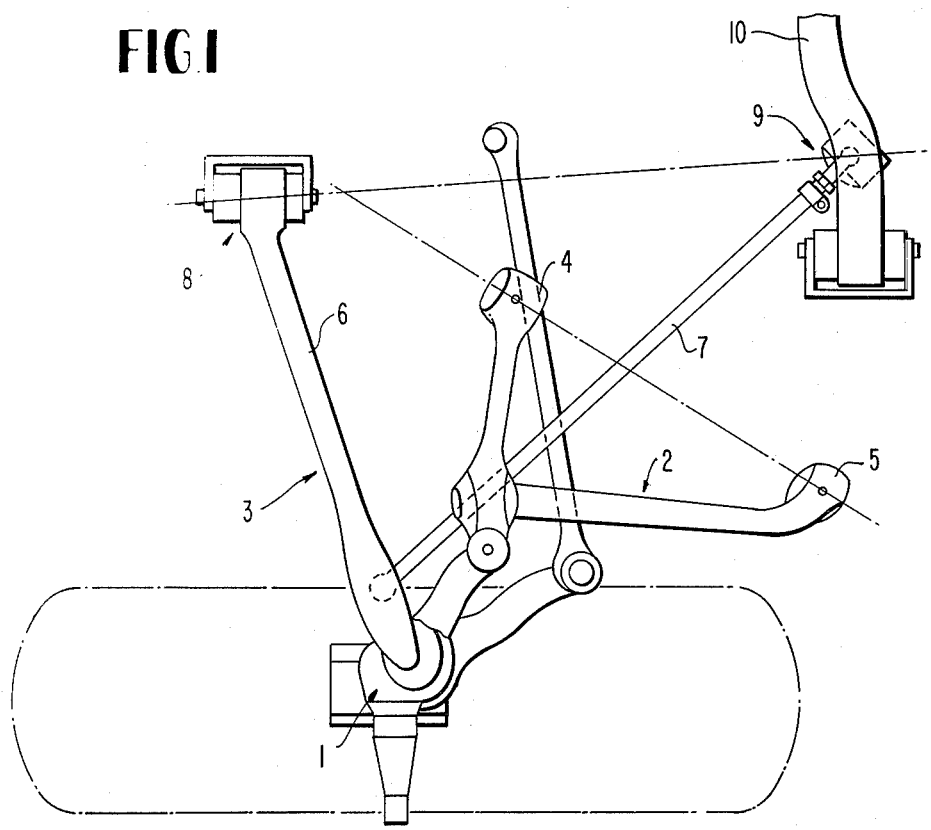
FIG. 1 is a plan view of the left front wheel and of parts of a front axle provided with a brake support.

Referring now to the drawing wherein like reference numerals are used throughout the various views to designate like parts, in the front wheel suspension illustrated in FIG. 1 which is constructed as independent wheel suspension, a wheel carrier generally designated by reference numeral 1 is operatively connected with an upper guide member generally designated by reference numeral 2 and with a lower guide member generally designated by reference numeral 3. Both guide members 2 and 3 are constructed triangularly shaped whereby the upper guide member 2 is connected with the vehicle body by way of points of pivotal connections 4 and 5 in a manner not illustrated in detail, and the lower guide member 3 which includes an arm 6 and a strut 7, is connected at the vehicle body by way of an elastic bearing support generally designated by reference numeral 8 and by way of a ball joint generally designated by reference numeral 9 with a yoke extending approximately in the vehicle transverse direction which, in its turn, is again elastically operatively connected with the body.

Figure 2:
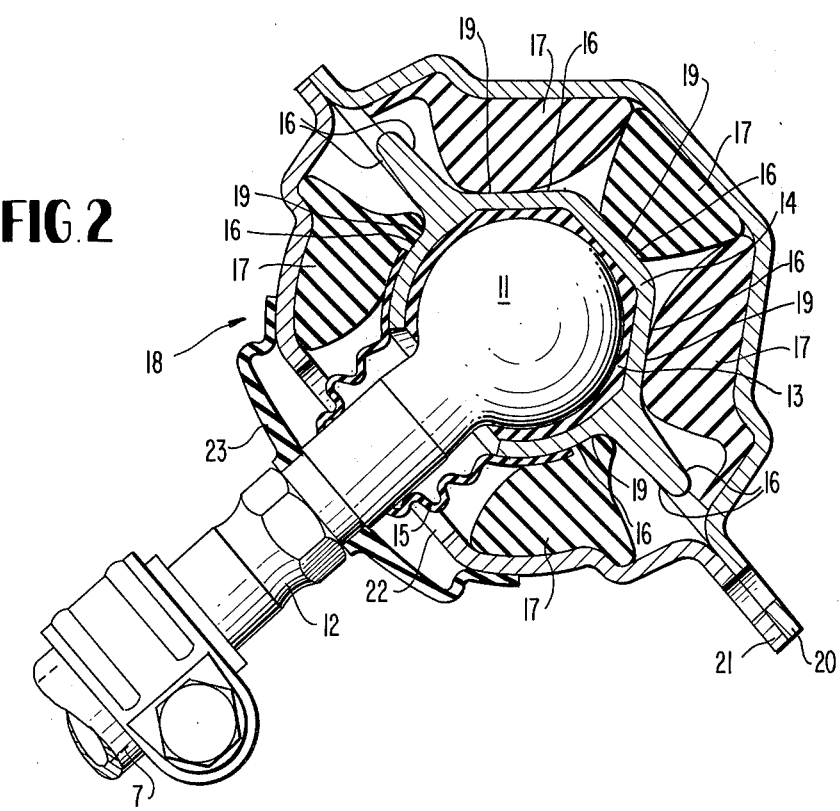
FIG. 2 is a cross-sectional view through a first embodiment of a ball joint according to the present invention for use in the front axle suspension of FIG. 1.

One possible construction of the ball joint designated in FIG. 1 by reference numeral 9 is illustrated in detail in FIG. 2. A ball pin 12 provided with a ball 11 is connected in any conventional manner with the coaxially adjoining strut 7, whose effective length can be changed in that the ball pin 12 is screwed in more or less far. The ball 11 is surrounded by a bearing member 13 made of synthetic material of any conventional type such as conventional synthetic resinous bearing material which, in its turn, is accommodated in a ball housing 14. A bellows seal 15 prevents the escape of the lubricant which is filled in once and for all. The ball housing 14 includes abutment surfaces 16 at which abut rubber spring elements 17 having an approximately arcuately curved shape, which project from an outer housing generally designated by reference numeral 18 that is spaced on all sides from the ball housing 14, in such a manner that the curved portion 19 of the rubber spring elements 17 faces the abutment surfaces 16.

The outer housing 18 consists of two parts 20 and 21 which during assembly exert a certain prestress on the rubber spring elements 17 which are arranged approximately circumferentially. It is achieved by the suitable configuration of the spring elements 17 that smaller tension and compression forces introduced by way of the ball pin 12, are absorbed softly and without producing any noises. Only in case of larger spring paths, the characteristics of the spring elements 17 stiffen progressively, i.e., become progressively harder so that large forces are absorbed with spring paths which are not excessively large, whereby the pressure is introduced into the spring elements 17 by way of the entire projection surface of the ball housing 14. As a result thereof, the maximum load per unit area of the rubber spring elements 17 can be kept within tolerable limits. Toward the end of the possible spring path in case of compressional loads, the free surface of the spring elements becomes approximately zero. In contrast thereto, the occurring tensional forces are small so that the aperture 22 necessary for the passage of the ball pin 12 and of the bellows seal 15 which is located in the tensional bearing area, cannot become noticeable in an interfering manner. In order that, for example, no foreign parts can penetrate through the aperture 22, a cap 23 is provided which is supported on the one hand, at the ball pin 12 and, on the other, at the outer housing 18.

Figure 3:
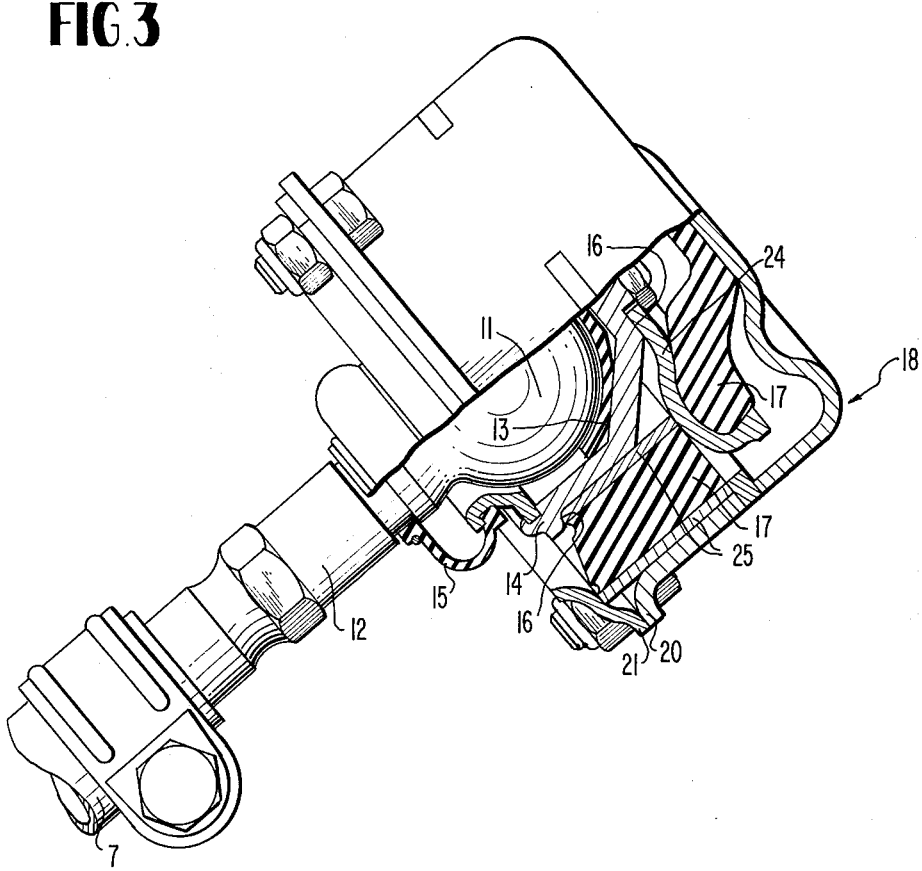
FIG. 3 is an elevational view, partly in cross section, of a further embodiment of a ball joint in accordance with the present invention which may be used with the front axle suspension of FIG. 1.

The embodiment according to FIG. 3 corresponds essentially to that of FIG. 2 so that for functionally analogous parts, the same reference numerals are used. One of the abutment surfaces 16 is supported by interposition of a spring washer or spring disk 24 at the associated rubber spring element 17 which acts in the sense of a series-connection on the other rubber spring element 17 constructed as thrust or shearing rubber bearing. As a result of the cooperation of the rubber spring elements 17 which are constructed in a particular manner, small force fluctuations are absorbed by shearing deformation without displacement of rubber volumes, which leads to an increased noise damping. In order to keep the toe-in and toe-out changes within narrow limits even in case of the introduction of large forces, only small spring deflections of the rubber spring elements 17 are permissive. The latter therefore possess a strongly progressive characteristic. During compressional loads of the strut 7, the rubber spring element 17 facing the bottom of the outer housing 18 is caused by the specially shaped spring disk 24 and the bottom of the housing 18 to abut continuously until a limitation of the spring deflection takes place by the blocking action. During a movement in the opposite direction, above all the spring action of the rubber spring element 17 provided with a mounting or fitting 25 becomes effective whereby a sufficient progression is achieved in that the spring disk or washer 16 and the lower housing part 21 decrease the deformable rubber volume with increasing spring deflection.

Both described embodiments fully satisfy the requirements and demands contemplated of the same in that the ball joint 9 permits a movement of the strut 7 acting as brake support rod corresponding to the inward spring stroke position of the guide member 3 (FIG. 1) without the occurrence of stresses at that time. Only in case of longitudinal forces in the strut 7, the bearing support of the ball housing 14 becomes effective in rubber spring elements 17. This brings about a soft absorption of shocks in case of smaller forces and tire non-uniformities and nonetheless in case of large forces, as occur during the braking of the vehicle, causes only small strokes or deflections. It is possible by the functional separation of the pivot movement—caused by inward axle spring deflection—from the axial movement during the occurrence of longitudinal forces in the ball joint 9, to undertake the matching of the elastic bearing support independently of kinematic conditions. Furthermore, by reason of the coaxial arrangement of the strut 7 and of the ball pin 12, the strut 7 can be constructed relatively slender since a force introduction free of bending movements takes place under all conditions.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A ball joint comprising:
    strut means including a member extending along an axis,
    a ball pin and ball connected with and carried by the strut means, said ball pin adjoining said strut means at an end of said member, and extending along said axis,
    bearing means engaged directly with the ball,
    ball housing means directly supporting the bearing means, said ball housing means including abutment surface means,
    outer housing means spaced from and at least partially surrounding the ball housing means,
    and first and second rubber spring element means interposed between said outer housing means and said abutment surface means for elastically absorbing and transferring forces during relative movement of said ball pin and ball with said outer housing means,
    wherein said first and second rubber spring element means include a series connection of first and second rubber spring elements of different types, said first rubber spring element being constructed and disposed for elastically absorbing and transferring both tension and compression loads in said strut means during relative movement of said ball pin and ball with said outer housing means, said second rubber spring element being constructed and disposed for elastically absorbing primarily only compression loads in said strut means during relative movement of said ball pin and ball with said outer housing means.

2. A ball joint according to claim 1, characterized in that the bearing means consists of synthetic material.

3. A ball joint according to claim 2, further comprising a seal means, characterized in that the seal means is a bellows seal.

4. A ball joint according to claim 2, characterized in that said strut means is part of a brake support means used in a front axle of a motor vehicle.

5. A ball joint according to claim 2, characterized in that the outer housing means is constructed two-partite and in that during the assembly of the two housing parts, a predetermined prestress is applied on the rubber spring elements.

6. A ball joint according to claim 5, characterized in that during tension and compression loads of the strut means, respectively different of said rubber spring elements are utilized for the force absorption.

7. A ball joint according to claim 5, characterized in that cap means supported at the ball pin and at the outer housing means are provided for protecting the rubber spring elements against external influences.

8. A ball joint according to claim 7, characterized in that a bellows seal is provided for sealing the space between said ball housing means and said strut means.

9. A ball joint according to claim 8, characterized in that during tension and compression loads of the strut means, respectively different of said rubber spring elements are utilized for the force absorption.

10. A ball joint according to claim 8, characterized in that said strut means is part of a brake support means used in a front axle of a motor vehicle.

11. A ball joint according to claim 1, characterized in that the outer housing means is constructed two-partite and in that during the assembly of the two housing parts, a predetermined prestress is applied on the rubber spring elements.

12. A ball joint according to claim 1, characterized in that during tension and compression loads of the strut means, respectively different of said rubber spring elements are utilized for the force absorption.

13. A ball joint according to claim 1, characterized in that cap means supported at the ball pin and at the outer housing means are provided for protecting the rubber spring elements against external influences.

14. A ball joint according to claim 13, characterized in that a bellows seal is provided for sealing the space between said ball housing means and said strut means.

15. A ball joint according to claim 1, wherein said first rubber spring element is a shearing rubber bearing.

16. A ball joint according to claim 1, further comprising a spring retainer means interposed between said abutment surface means and at least one of said first and second rubber spring elements, wherein said spring retainer means acts as said series connection between said first and second rubber spring elements of different spring characteristics.

17. A ball joint comprising:
strut means,
a ball pin connected with and carried by the strut means,
bearing means engaged directly with the ball pin,
ball housing means directly supporting the bearing means, said ball housing means including abutment surface means,
outer housing means spaced from and at least partially surrounding the ball housing means,
first and second rubber spring element means interposed between said outer housing means and said abutment surface means for elastically absorbing and transferring forces during relative movement of said ball pin and said outer housing means,
wherein said first and second rubber spring element means include first and second rubber spring elements of different types, said first rubber spring element being constructed and disposed for elastically absorbing and transferring both tension and compression loads in said strut means during relative movement of said ball pin and said outer housing means, said second rubber spring element being constructed and disposed for elastically absorbing primarily only compression loads in said strut means during relative movement of said ball pin and said outer housing means, and
a spring retainer means interposed between said abutment surface means and at least one of said first and second rubber spring elements, wherein said spring retainer means is a spring washer supportingly engaged with said second rubber spring element.

18. A ball joint according to claim 17, wherein said first rubber spring element is a shearing rubber bearing supported in a fitting, said fitting having a first side connected for movement with said ball housing means and a second side connected for movement with said outer housing means, said shearing rubber bearing being disposed in and filling a space between said first and second sides of said fitting.

19. A ball joint according to claim 18, wherein said strut means extends in an axial direction with said ball pin at one end thereof, wherein said second rubber spring element is disposed for elastically absorbing compression forces in said strut means during axial movement of said ball pin in an inward direction into said outer housing means.

20. A ball joint according to claim 19, wherein said fitting and said first rubber spring element are disposed in surrounding relationship to an axis extending in the axial direction of said strut means for elastically absorbing tension forces in said strut means during axial movement of said ball pin opposite said inward direction and for elastically absorbing compression forces in said strut means during axial movement of said ball pin in said inward direction.

21. A ball joint according to claim 16, wherein said second rubber spring element is configured and disposed for elastically absorbing compression forces in said strut means during axial movement of said ball pin in an inward direction toward said outer housing means, and wherein said first rubber spring element is configured and disposed for elastically absorbing both compression and tension forces in said strut means during respective axial movements of said ball pin in both opposite axial dimensions with respect to said outer housing means.

22. A ball joint comprising:
strut means,
a ball pin and ball connected with and carried by the strut means,
bearing means engaged directly with the ball,
ball housing means directly supporting the bearing means, said ball housing means including abutment surface means,
outer housing means spaced from and at least partially surrounding the ball housing means,
and first and second rubber spring element means including first and second rubber spring elements interposed between said outer housing means and said abutment surface means for elastically absorbing and transferring forces during relative movement of said ball pin and ball with said outer housing means,
wherein said strut means extends in an axial direction with said ball pin extending coaxially at one end thereof, and wherein said second rubber spring element is disposed in axial alignment with said strut means and mounted on the axis of said strut means and said ball pin facing the extreme axial end of said ball for absorbing compression forces in said strut means during axial movement of said ball pin in an inward direction into said outer housing means.

23. A ball joint according to claim 22, wherein said first rubber spring element is disposed laterally of an axis extending in the axial direction of said strut means for elastically absorbing tension forces in said strut means during axial movement of said ball pin opposite said inward direction.

24. A ball joint comprising:
strut means
a ball pin connected with and carried by the strut means, bearing means engaged directly with the ball pin,
ball housing means directly supporting the bearing means, said ball housing means including abutment surface means,
outer housing means spaced from and at least partially surrounding the ball housing means,
first and second rubber spring element means interposed between said outer housing means and said abutment surface means for elastically abosrbing and transferring forces during relative movement of said ball pin and said outer housing means,
wherein said strut means extends in an axial direction with said ball pin at one end thereof, wherein said second rubber spring element is disposed in axial alignment with said strut means and facing the extreme axial end of said ball pin for absorbing compression forces in said strut means during axial movement of said ball pin in an inward direction into said outer housing means, and
wherein said first rubber spring element is disposed laterally of an axis extending in the axial direction of said strut means for elastically absorbing tension forces in said strut means during axial movement of said ball pin opposite said inward direction, and
a third rubber spring element disposed laterally of said axis for aiding said first rubber spring element in elastically absorbing compression forces in said strut means during axial movement of said ball pin in said inward direction.

25. A ball joint according to claim 24, wherein said first, second, and third rubber spring elements are separate from and spaced from one another.

* * * * *